No. 730,323. PATENTED JUNE 9, 1903.
M. T. WHITE & T. E. VAN NESS.
NECKBAND FASTENER.
APPLICATION FILED DEC. 2, 1902.
NO MODEL. 3 SHEETS—SHEET 1.
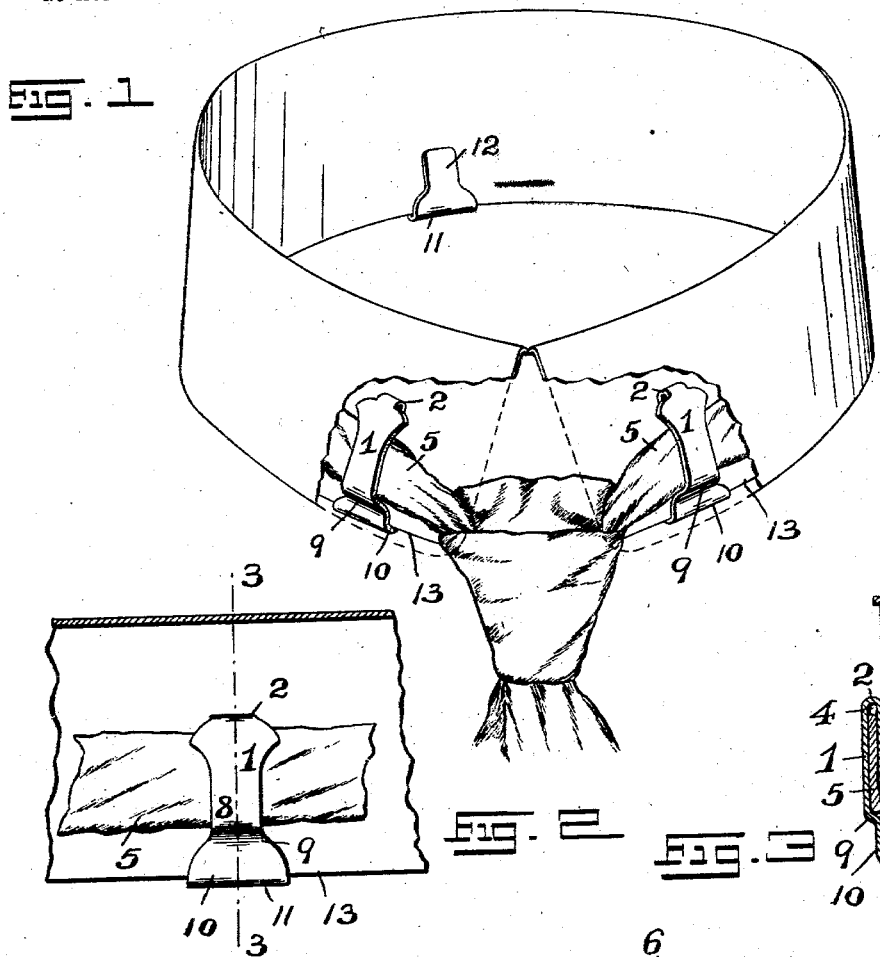
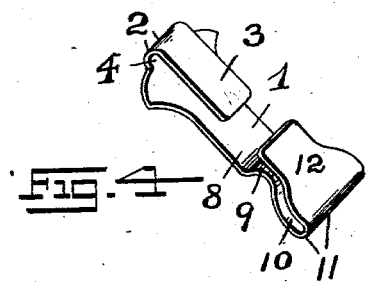
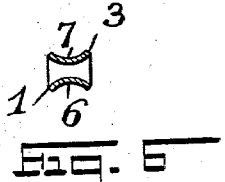
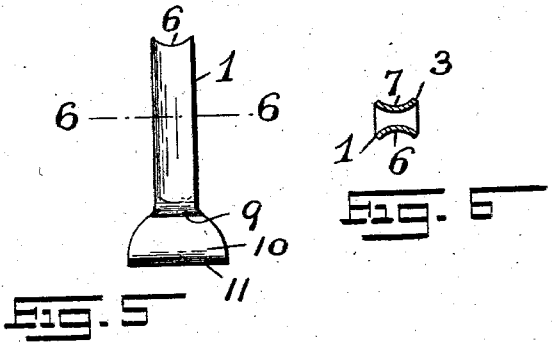
WITNESSES:
Geo. D. Richards
Geo. Douglass.
INVENTORS:—
Merritt T. White, &
Thomas E. Van Ness,
BY Fred L. C. Fraentzel,
ATTORNEY No. 730,323. PATENTED JUNE 9, 1903.
M. T. WHITE & T. E. VAN NESS.
NECKBAND FASTENER.
APPLICATION FILED DEC. 2, 1902.
NO MODEL. 3 SHEETS—SHEET 2.
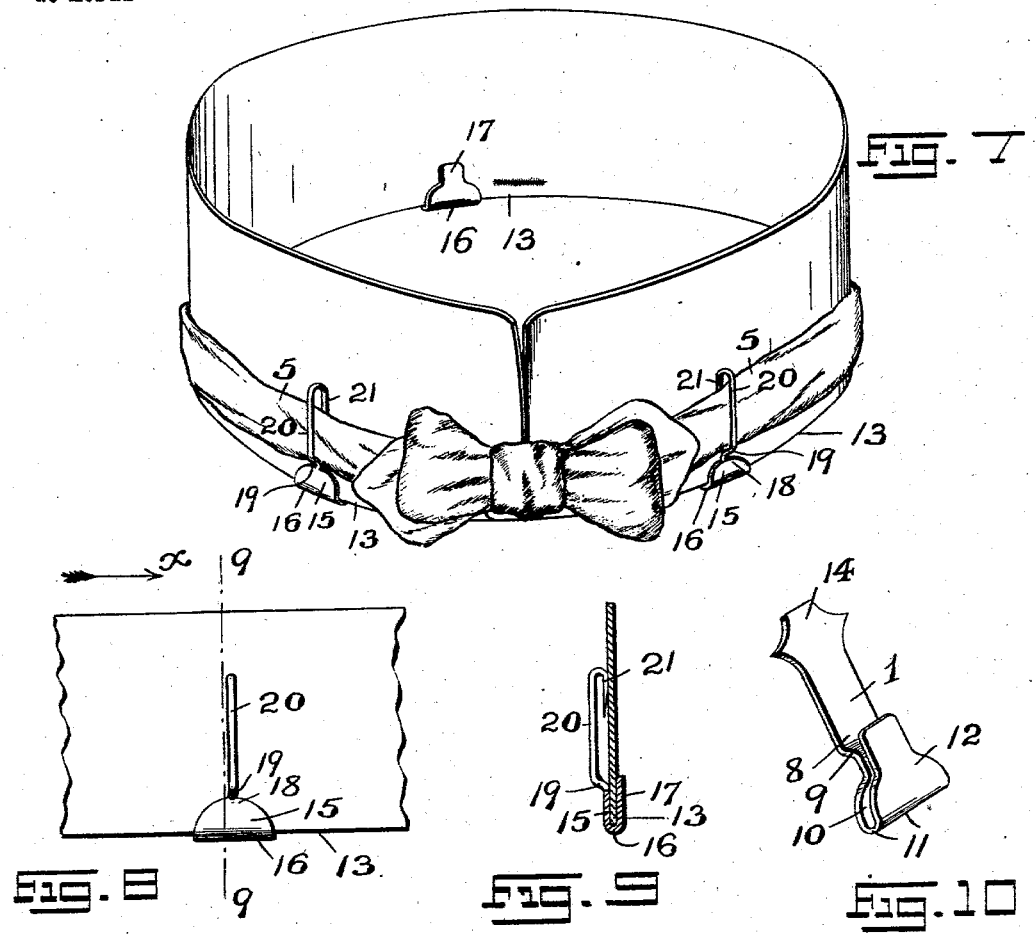
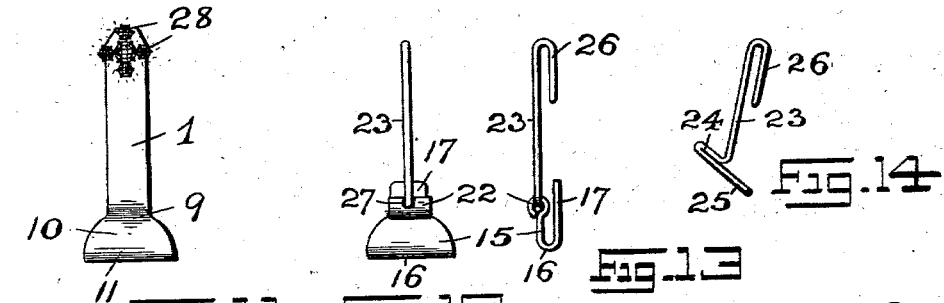
WITNESSES:
Geo. A. Richards
Geo. Douglass
INVENTORS:
Merritt T. White &
Thomas E. Van Ness
BY
Fred'k C. Fraentzel,
ATTORNEY

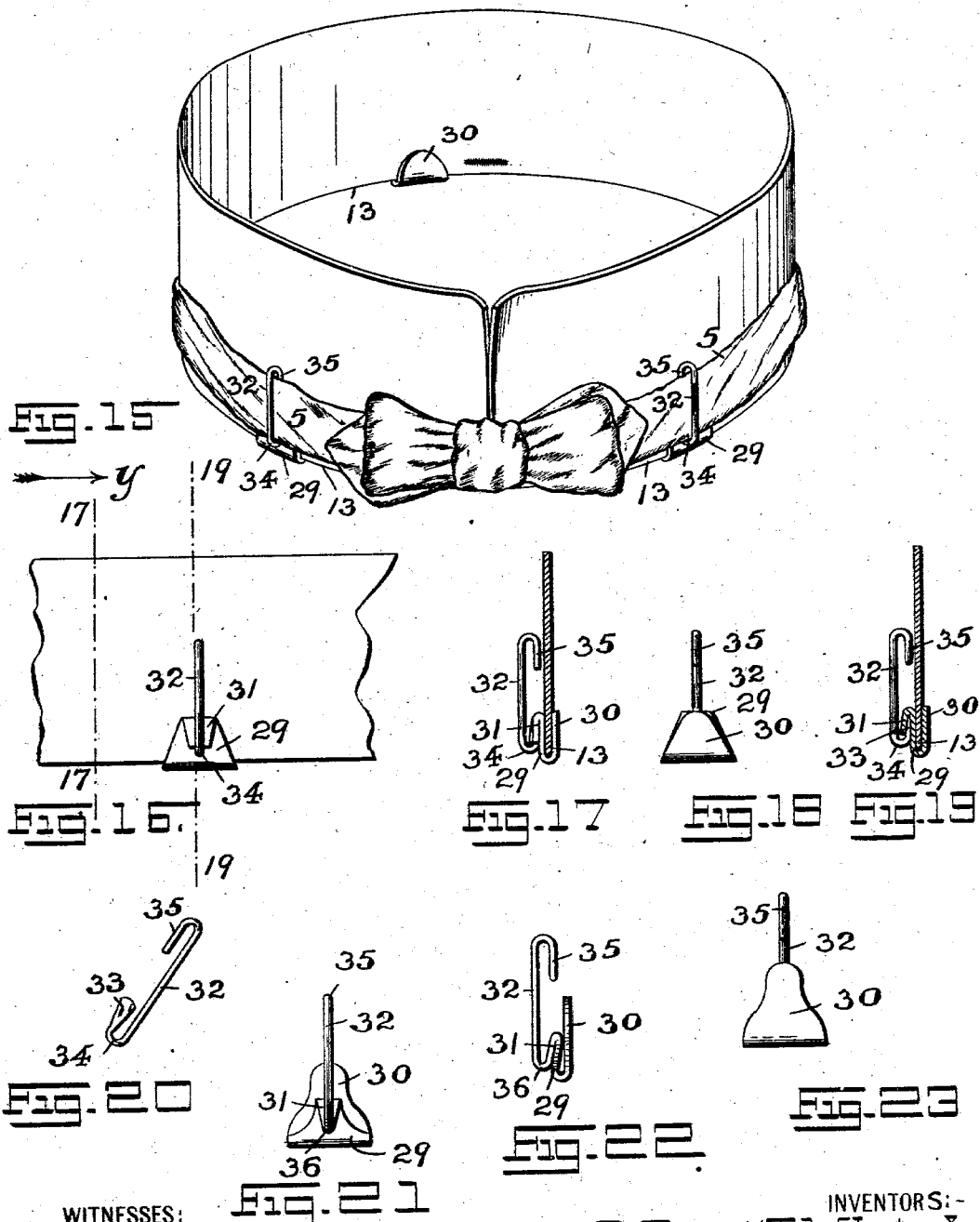

No. 730,323. Patented June 9, 1903.

UNITED STATES PATENT OFFICE.

MERRITT T. WHITE AND THOMAS E. VAN NESS, OF NEWARK, NEW JERSEY; SAID VAN NESS ASSIGNOR TO SAID WHITE.

NECKBAND-FASTENER.

SPECIFICATION forming part of Letters Patent No. 730,323, dated June 9, 1903.

Application filed December 2, 1902. Serial No. 133,641. (No model.)

*To all whom it may concern:*

Be it known that we, MERRITT T. WHITE and THOMAS E. VAN NESS, citizens of the United States, residing at Newark, in the county of Essex and State of New Jersey, have invented certain new and useful Improvements in Neckband-Fasteners; and we do hereby declare the following to be a full, clear, and exact description of the invention, such as will enable others skilled in the art to which it appertains to make and use the same, reference being had to the accompanying drawings, and to numerals of reference marked thereon, which form a part of this specification.

The present invention has reference generally to improvements in scarf or necktie retainers; and the invention relates more particularly to the novel construction of scarf or necktie retainers hereinafter set forth and which are adapted to be used with "turndown" as well as with "stand-up" collars and the retaining device or devices being attached to the collar before the latter is buttoned to the band of the shirt, the band of the scarf or necktie being in slidable retaining engagement with a portion of one or more of the retainers in the manner and for the purposes to be hereinafter more fully set forth.

The principal objects of the present invention are to provide a novel necktie or scarf band retainer to be used with all kinds of collars and which is especially adapted for use with turn-down collars, the retaining device being of a simple and cheap construction and easily to be secured in its operative position upon the collar.

A further object of the present invention is to provide a scarf-band or necktie-band retainer or holder which will prevent the band from riding up upon the collar and will also permit of a free sliding movement of the band between the turned-over members of a turn-down collar or upon the side of a straight collar while placing the band in position and while adjusting the tie or scarf, the retaining device being of such construction that the binding action or friction between the band of the scarf or tie and the oppositely-located inner surfaces of the turned-over members of the collar is reduced to a minimum if not entirely obviated, and the band can be freely pulled back and forth upon the collar without any danger of pulling the band of the tie or scarf out of shape or tearing it.

The invention therefore consists in the novel construction of tie or scarf band retaining device hereinafter set forth; and, furthermore, the invention consists in the various novel arrangements and combinations of parts, as well as in the details of the construction thereof, all of which will be described in the following specification and then finally embodied in the clauses of the claim.

The invention is clearly illustrated in the accompanying drawings, in which—

Figure 1 is a perspective view of a turndown collar with portions thereof broken away, said view illustrating in connection with said collar the band of a scarf and an arrangement of retaining devices applied to the collar, all embodying the principles of this invention. Fig. 2 is a sectional representation of a portion of the collar represented in said Fig. 1, with a face view of one of the retaining devices in its operative position upon the inner collar member and a portion of the band of the scarf held in place by means of the said retaining device. Fig. 3 is a vertical cross-section taken on line 3 3 in said Fig. 2, and Fig. 4 is a perspective view of the said retaining device. Fig. 5 is a face view, and Fig. 6 a horizontal section taken on line 6 6 in said Fig. 5, of a retaining device of a slightly-modified form of construction. Fig. 7 is a perspective view of a stand-up or straight collar and a tie, illustrating in connection with the said collar and the band of the tie a modified construction of retaining device, the same, however, embodying all the principles of the present invention. Fig. 8 is a face view of a portion of the collar and face view of one of the retaining devices represented in said Fig. 7, and Fig. 9 is a transverse section taken on line 9 9 in said Fig. 8 looking in the direction of the arrow *x* in said Fig. 8. Fig. 10 is a perspective view of still another modified form of retaining device; and Fig. 11 is a face view of a retaining device made according to the principles of the present invention, the device being provided with any suitable ornament, whereby it is adapted for use more especially with the straight collars worn by women. Figs. 12 and 13 are a face and side view, respectively, of another modified construction of retaining device; and Fig. 14 is a perspective view of a hooked retaining pin or member employed in connection therewith. Fig. 15 is a perspective view of a stand-up or straight collar and a tie, the collar being provided with still another modified form of retaining device for the band of a tie. Fig. 16 is a face view of a portion of the said collar and one of the retaining devices represented in said Fig. 15. Fig. 17 is a transverse section taken on line 17 17 in said Fig. 16 looking in the direction of the arrow $y$ in said figure. Fig. 18 is a rear view of the said retaining device, and Fig. 19 is a transverse vertical section taken on line 19 19 in said Fig. 16 looking in the direction of the said arrow $y$. Fig. 20 is a perspective view of a hook-shaped wire member employed with the retaining device represented in said Figs. 15 to 19, inclusive. Figs. 21, 22, and 23 are a face, side, and rear view, respectively, of another modified form of retaining device, but still embodying all the features of the present invention.

Similar characters of reference are employed in all of the said above-described views to indicate corresponding parts.

Referring to Figs. 1 to 6, inclusive, it will be seen that the form of retaining device represented in said figures consists, essentially, of a main body 1 of any desired ornamental configuration in outline, the said body 1 being formed at its upper part with a curved portion 2, which terminates in a downwardly-extending member 3, forming a retaining-hook with a suitable space, as 4, between the opposite faces of the said body 1 and said member 3, in which the band 5 of a scarf or necktie can be slidably arranged, as illustrated. The said main body 1 and the member 3 thereof are both preferably made from flat sheet metal, as indicated in Figs. 1, 2, and 4; but, if desired, the said body 1 may be made concavo-convex, as at 6, and the member 3 being made concavo-convex, as at 7, to give greater stability of the device, all of which will be clearly evident from an inspection of Figs. 5 and 6. Near its lower portion 8 the said body 1 is provided with a curved connecting portion 9 and a downwardly-extending part 10, which is bent, as at 11, and then terminates in an upwardly-extending and hook-shaped clamping tongue or member 12. The upper end portion of the said tongue or member 12 extends directly above and in close proximity to the curved holding portion 9, as clearly illustrated, and whereby one or more of the said retaining devices are capable of being clamped over the lower edge 13 of the inner collar member of a turn-down collar, as indicated in Figs. 1, 2, and 3 of the drawings. When the retaining device has in this manner been clamped in position, then the previously-mentioned member 3 will lie closely against the face of the inner collar member, as shown, thus providing the guiding-space 4 for the band 5 to slide without friction between the turned-down members of the collar, while the curved portion 2 of the retaining device prevents the riding up of the band 5, and thereby retains the scarf or tie in its properly-adjusted position. Of course it will be understood that this form of retainer may also be used with the stand-up collars.

One manner of using the retaining device is illustrated in said Fig. 1 of the drawings. Three of such retainers are usually employed with the collar, the same being arranged substantially in the positions indicated in said Fig. 1 before the collar is fastened to the neckband of the shirt and the band of the scarf or tie placed between the inner surfaces of the body 1 and member 3 of each retaining device, as shown. This permits of the knot or tie to be easily formed without any possibility of the displacement of the band from its position upon the collar member and also allows for a free and easy motion laterally in either direction upon the collar without any friction or the possibility of tearing the material when the knot or scarf is being pulled back and forth upon the collar for its proper adjustment.

The preferred form of holder or retaining device is that described hereinabove and illustrated in Figs. 1 to 6, inclusive; but where it is desired simply to provide a device which will allow for a free lateral movement of the scarf or necktie band 5 between the collar members of a turn-down collar then the curved portion 2 and the member 3 may be dispensed with and the body 1 of the retaining device may be made with any suitable and ornamental end portion 14, as represented in Fig. 10 of the drawings.

Although the previously-described constructions of retaining devices may also be used with a straight or stand-up collar, still with such collars it may be desirable to use the form and construction of retaining devices represented in Figs. 7, 8, 9, 12, and 13.

The device represented in Figs. 7, 8, and 9 consists, essentially, of a body 15, having the lower curved edge 16 and the upwardly-extending member 17, as shown, all of which form a holding or clamping hook for attaching the device to the lower edge of the collar. Upon its upper portion 18 the said body 15 is made with a reduced and outwardly-extending member 19, which terminates in an upwardly-extending and pin-shaped post 20, terminating at its free end in a downwardly-extending hook-shaped member 21, as clearly illustrated.

Instead of forming the body 15 and post 20 in one piece, as illustrated in Figs. 7, 8, and 9, the said body 15 may have a bead 22, as shown in Figs. 12 and 13, in which is arranged in any suitable manner against turning the bent-over portions 24 and 25 of a post or stem 23, of wire, the same being provided at its upper end with a hook-shaped portion 26, as shown. The said bead 22 is made with a slot 27, through which the said post or stem 23 is passed, the bead being tightly closed down upon the portions 24 and 25, so as to rigidly secure the said post or stem in its position relative to the said body 15. From an inspection of said Fig. 13 it will be seen that the curved surface of the bead 22 extends in a direction to the right toward the member 17, the said curved surface being the equivalent of the curved connecting portion 9 (represented in Figs. 3 and 4) or the part 19, (illustrated in Figs. 7 and 9,) and therefore answers the same purposes as the parts 9 and 19.

For ladies' uses the retaining device may be made as represented in Fig. 11, the main body of the device being provided with suitable ornaments, as 28.

In the construction of retaining device represented in Figs. 15 to 20, inclusive, is illustrated still another form of retainer, which is more especially adapted for use with a stand-up or straight collar. The device represented in these figures consists, essentially, of a body 29, having a clamping member 30, by means of which it can be clamped in its operative position upon the lower edge of a collar, as shown. The said main body 29 is also made at its upper edge with a downwardly-bent lip or member 31, and suitably secured between the outer face of said main body 29 and the inner face of said lip or member 31, as illustrated more particularly in Fig. 19, is a preferably flattened end 33 of a wire member 32, the said end 33 being connected with said member 32 by means of a curved or bent portion 34, the said member 32 extending in an upward direction and terminating at the top in a downwardly-extending hook-shaped member 35, as illustrated. The purpose of this form of hook-shaped member 32 is that its lower curved portion 34 may be brought as near as possible to the lower edge of the collar, thereby bringing the band of the tie or scarf closely to the said lower edge of the collar and hiding the greater portion of the main body 29 of the retaining device from view. In Figs. 21, 22, and 23 we have illustrated a similarly-constructed device, the member 32 and the lip 31 of the body 29 being integrally connected by the portion 36, as shown. In all other respects this construction is the same as that described with Figs. 15 to 20, inclusive.

When the several retaining devices are used with the band of ties or scarfs to be arranged about a straight or stand-up collar, then the various parts of the devices may be japanned or provided with coloring-matter corresponding to the color of the fabric of the tie or scarf, so that the retainer is not so noticeable when used in this manner.

We are fully aware that changes may be made in the various arrangements and combinations of the parts without departing from the scope of the present invention. Hence we do not limit our invention to the exact arrangements and combinations of the parts as described in the foregoing specification and as illustrated in the accompanying drawings; nor do we confine ourselves to the exact details of the construction of any of the said parts.

Having thus described our invention, what we claim is—

1. As a new article of manufacture, a retaining device for retaining the band of a necktie or scarf in its position upon a collar, said retaining device comprising a main body, an inwardly-bent portion near the lower end of said main body having a downwardly-extending part, and an upwardly-extending clamping-tongue connected with said downwardly-extending part, all adapted to be slipped over the lower edge of said collar, said main body being adapted to lie closely against the band of the said necktie or scarf, substantially as and for the purposes set forth.

2. As a new article of manufacture, a retaining device for retaining the band of a necktie or scarf in its position upon a collar, said retaining device comprising a main body, an inwardly-bent portion near the lower end of said main body having a downwardly-extending part and an upwardly-extending clamping-tongue connected with said downwardly-extending part, all adapted to be slipped over the lower edge of said collar, and a guide connected with said main body in which the band of said necktie or scarf is slidably arranged, substantially as and for the purposes set forth.

3. As a new article of manufacture, a retaining device for retaining the band of a necktie or scarf in its position upon a collar, said retaining device comprising a main body, an inwardly-bent portion near the lower end of said main body having a downwardly-extending part and an upwardly-extending clamping-tongue connected with said downwardly-extending part, all adapted to be slipped over the lower edge of said collar, and an inwardly and downwardly extending hook-shaped member on said body for retaining the band of said necktie or scarf against upward displacement but permitting of a laterally-sliding motion of said band, substantially as and for the purposes set forth.

In testimony that we claim the invention set forth above we have hereunto set our hands this 24th day of November, 1902.

MERRITT T. WHITE.
THOMAS E. VAN NESS.

Witnesses:
FREDK. C. FRAENTZEL,
WM. E. BLEWETT, Jr.